United States Patent [19]
Liedholz

[11] 3,952,206
[45] *Apr. 20, 1976

[54] PHOTOMETER CIRCUIT
[75] Inventor: Gerhard A. Liedholz, Miami, Fla.
[73] Assignee: Coulter Electronics, Inc., Hialeah, Fla.
[ * ] Notice: The portion of the term of this patent subsequent to Aug. 14, 1990, has been disclaimed.
[22] Filed: May 9, 1974
[21] Appl. No.: 468,491

[52] U.S. Cl. .......................... 250/565; 250/214 R; 250/573; 356/40; 356/179; 356/205
[51] Int. Cl.² ...................... G01J 3/46; G01N 33/16
[58] Field of Search ............... 250/214 R, 564, 565, 250/573; 356/39, 40, 42, 179, 205; 307/247 A, 293, 294

[56] References Cited
UNITED STATES PATENTS
| | | | |
|---|---|---|---|
| 3,566,133 | 2/1971 | Dorman et al. | 250/214 R |
| 3,622,795 | 11/1971 | Dorman et al. | 356/39 X |
| 3,703,336 | 11/1972 | Rosse et al. | 250/565 X |
| 3,752,995 | 8/1973 | Liedholz | 250/565 X |

OTHER PUBLICATIONS
"Timing Circuit", Hines and Radzik, IBM Technical Disclosure Bulletin, Vol. 6, No. 7, Dec. 1963, pp. 34 and 35.

Primary Examiner—Eli Lieberman
Assistant Examiner—E. R. La Roche
Attorney, Agent, or Firm—Silverman & Cass, Ltd.

[57] ABSTRACT

The photometer circuit is operative to receive and store a reference voltage which is generated in a photosensor by light which passes through a blank solution in a cuvette and is received at the photosensor. The photometer circuit includes reference voltage input control circuitry for placing the photometer circuit in a receiving and storage mode of operation for a predetermined period of time while the reference voltage is being generated in the photosensor. The photometer circuit includes a comparator having two inputs, a first electronic switch for coupling the output of the comparator to a voltage storage circuit and a second electronic switch for coupling the output of the voltage storage circuit to a voltage run-down circuit.

22 Claims, 4 Drawing Figures

PHOTOMETER CIRCUIT

BACKGROUND OF THE INVENTION

The present invention relates to a photometer circuit and more particularly to a reference voltage input control circuit for placing the photometer circuit in a reference voltage receiving and storing mode of operation and also more particularly to control, measurement and readout circuitry for controlling the operation of a photometer circuit in a comparing and measuring mode of operation by causing the photometer circuit to repeatedly measure, and then present a digital readout of the log of the reference voltage over the test voltage. The reference voltage is the voltage generated in a photosensor of the photometer circuit when light passing through a blank solution in a cuvette is received by the photosensor. The test voltage is generated in the photosensor by light passing through a liquid sample and received at the photosensor. The difference between the log of the reference voltage over the test voltage is indicative of the light absorbed by the liquid sample which in turn is indicative of the concentration of one or more chemicals in the liquid sample.

Heretofore, photometer circuits for measuring the log of a reference voltage over a test voltage have been proposed and such photometer circuits are disclosed in U.S. Pat. Nos. 3,566,133 and 3,752,995. The photometer circuit to be disclosed hereinafter includes several of the basic circuit components of the photometer circuit disclosed in U.S. Pat. No. 3,752,995 and includes additional circuits which constitute improvements to the photometer circuit disclosed in U.S. Pat. No. 3,752,995.

SUMMARY OF THE INVENTION

According to the invention there is provided in a photometer circuit operable to compare a reference voltage with a test voltage, control circuitry operable to place the photometer circuit in a receiving and storing mode of operation for a predetermined period of time during which a reference voltage is received and stored in the photometer circuit.

Also, according to the invention there is provided in the photometer circuit a comparator having first and second inputs, a reference voltage storage circuit, a voltage run-down circuit, a first electronic switch for coupling the comparator to the voltage storage circuit and a second electronic switch for coupling the voltage storage circuit to the voltage run-down circuit, a photoresponsive device connected to the first input, and a feedback circuit coupled between the voltage run-down circuit and the second input, and the control circuitry of the invention preferably includes a switching device which is momentarily operated and which is connected to a timing circuit to cause the timing circuit to operate an electronic switching circuitry for a predetermined period of time, the electronic switching circuitry being coupled to the first and second electronic switches and being operable to close the first and second electronic switches for the predetermined period of time during which a reference voltage generated in the photoresponsive device by light received thereat through a blank solution in a cuvette can be stored in the voltage storage circuit after which the first and second electronic switches are placed in an open circuit condition.

Further, according to the invention, there is provided a photometer circuit including a comparator having first and second inputs, a reference voltage storage circuit, an electronic switch for coupling the output of the storage circuit to the voltage run-down circuit, a photoresponsive device connected to the first input, a feedback circuit coupled between the voltage run-down circuit and the second input, the comparator being operative to compare a test voltage generated in the photoresponsive device with a voltage decay of a reference voltage temporarily stored in the voltage run-down circuit, timing circuitry, first control circuitry and second control circuitry, the first control circuitry being coupled to the timing circuit, to the second control circuitry and to the electronic switch and the second control circuitry being coupled to the output of the comparator, to the timing circuit, and to the first control circuit, the timing circuit being operative to generate a timed duration signal which is applied to the first control circuitry to cause the first control circuitry to transmit a switch-close signal to the electronic switch to close the same for a predetermined duration during which the voltage run-down circuit is charged to a reference voltage stored in the storage curcuit, the output signal from the comparator being at a quiescent value by reason of the fact that the reference voltage which is being applied via the feedback circuit to the second input is greater than the voltage applied to the first input from the photoresponsive device which receives light passing through a liquid sample, and being operative after the timed duration to cause the first control circuitry to transmit a switch-open signal to the electronic switch to open the same to start a voltage decay of the reference voltage stored in the voltage run-down circuit and now being applied via the feedback circuit to the second input and at the same time to transmit a signal to the second control circuitry to cause the second control circuitry to send a reset signal to the timing circuit for starting the generation of a timing signal equivalent to the time which elapses from the start of the voltage decay until the voltage decays to the value of the test voltage, at which time the output from the comparator changes generating a control signal which causes the second control circuitry to send a latch signal to the timing circuit which latches the timing signal at a desired point in time and transmits the latched timing signal to the readout device which presents a readout equivalent to the log of the reference voltage over the test voltage, the latch signal also being applied to the first control circuitry to reset the same and causes the second control circuitry to send a reset signal to the timing circuit for generating another timed duration signal to repeat the operations.

BRIEF DESCRIPTION OF THE DRAWINGS

FIG. 4 is a diagram showing the manner in which FIGS. 1, 2, and 3 should be arranged to connect the circuitry illustrated in those figures together to form the photometer circuit.

DESCRIPTION OF THE PREFERRED EMBODIMENT

Figure 1:
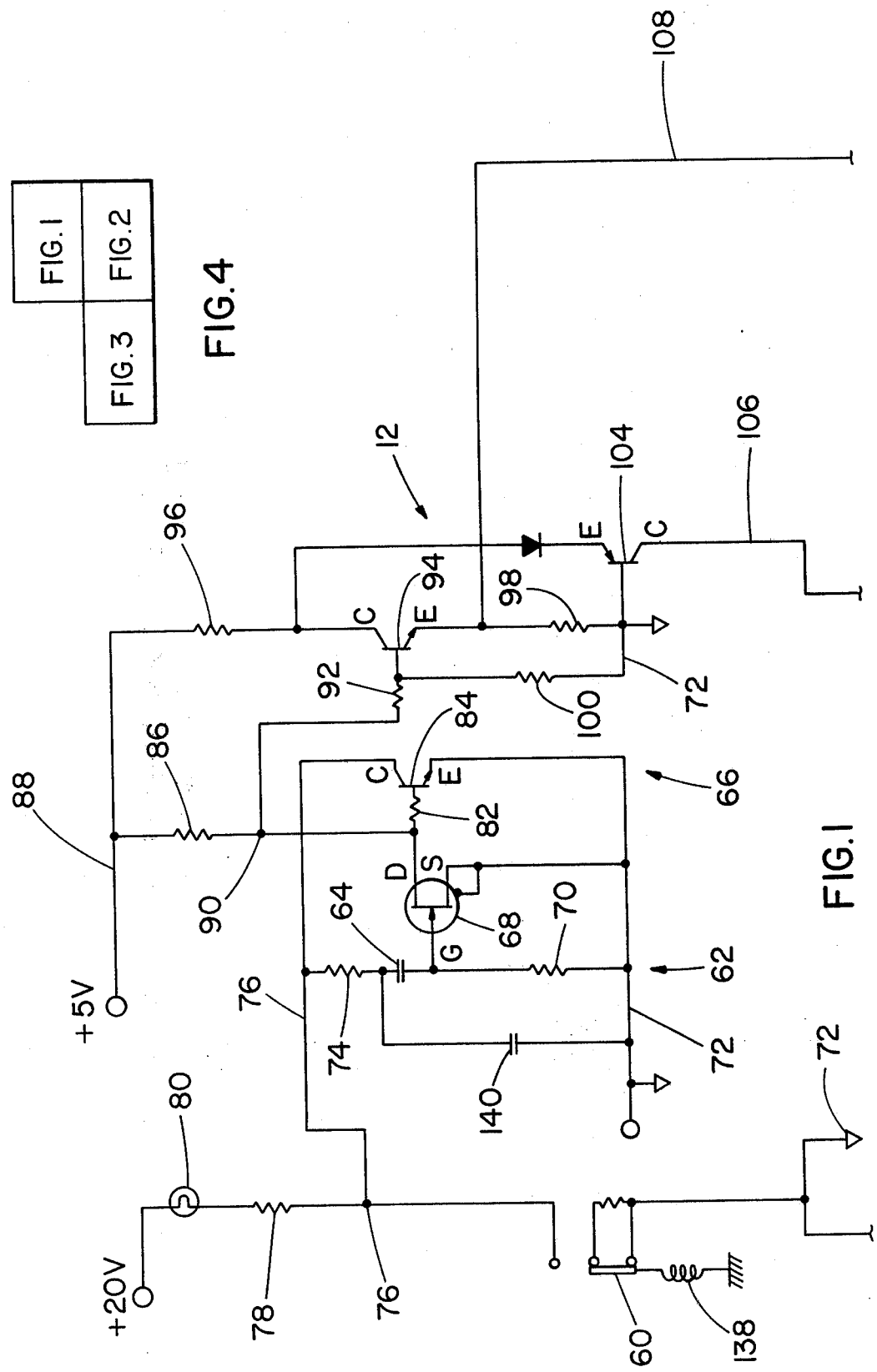
FIG. 1 is a schematic circuit diagram of the reference voltage input control circuit of the photometer circuit of the invention.
Figure 2:
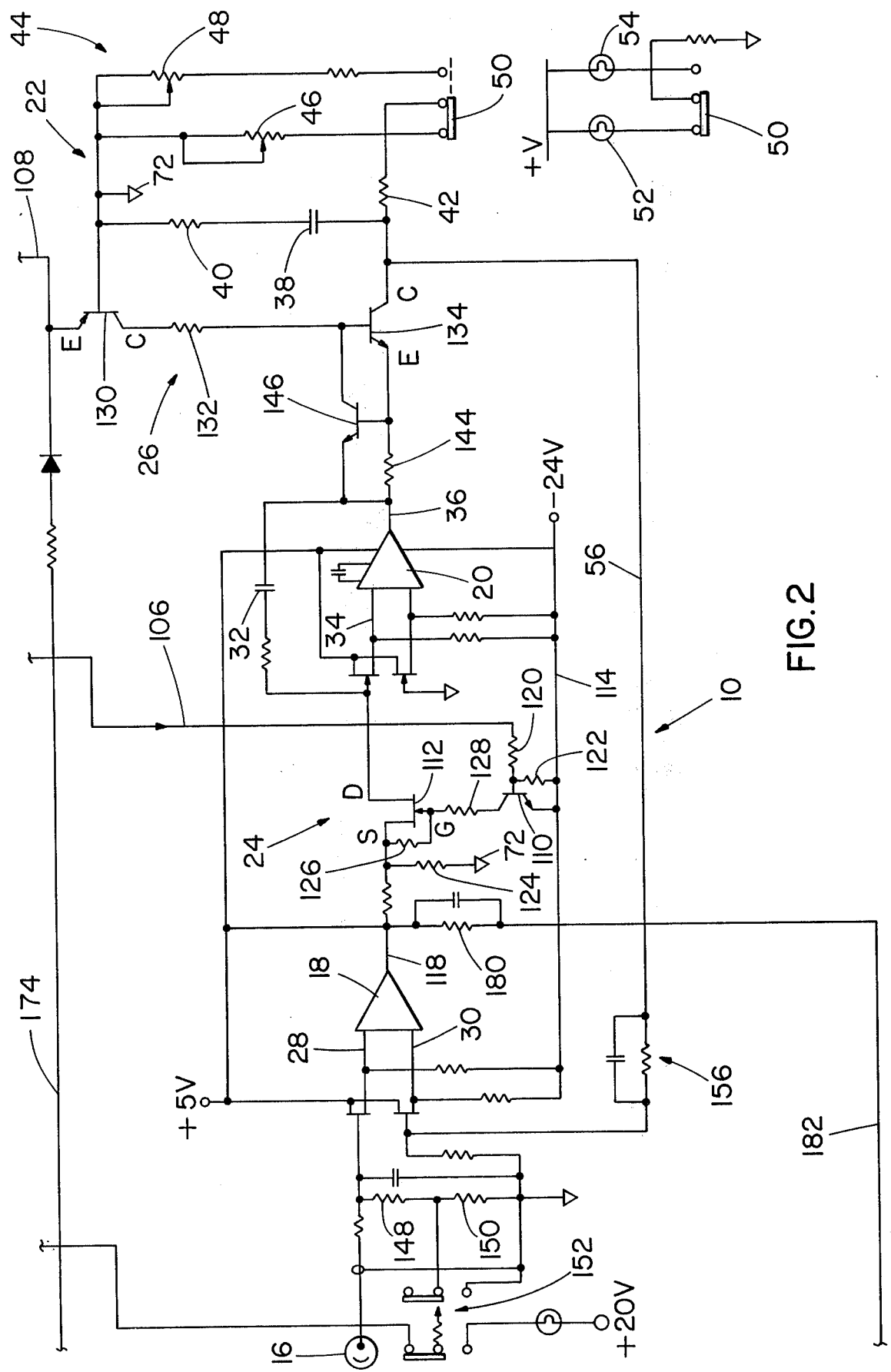
FIG. 2 is a schematic circuit diagram of the voltage receiving, comparing and storing circuitry of a photometer circuit.
Figure 3:
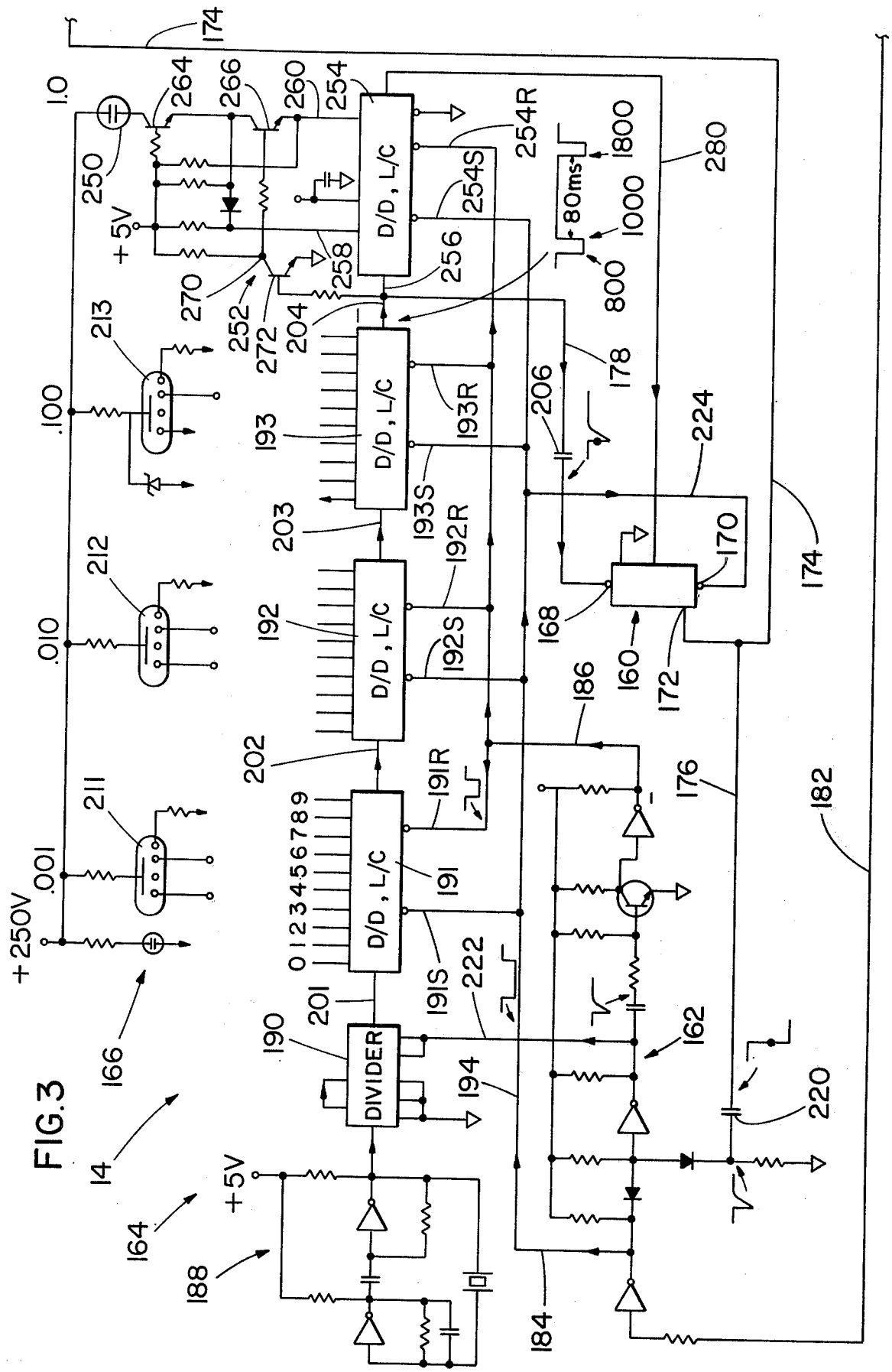
FIG. 3 is a schematic circuit diagram of the control, measurement and readout circuitry of the photometer circuit.

FIG. 2 illustrates the receiving, storing, and comparing circuitry of the photometer circuit hereinafter referred to as the comparing circuitry and identified generally by the reference numeral 10. In FIG. 1 is illustrated the reference voltage input control circuitry which is hereinafter referred to as the control circuitry and identified generally by the reference numeral 12. In FIG. 3 is illustrated the control measurement and readout circuitry which is hereinafter referred to as the readout circuitry and generally identified by the reference numeral 14.

The comparing circuitry 10 is similar in many respects to the circuitry disclosed in U.S. Pat. No. 3,752,995. The comparing circuitry 10 includes a photoresponsive device or photosensor 16. A light source is positioned to direct light toward the photosensor 16 and through a space in a cuvette holder (not shown). A 1 centimeter square cuvette (not shown) is positionable in the holder with a blank solution or a liquid sample therein. The holder is also capable of receiving conventional cylindrical test tubes with either a blank solution or a liquid sample therein. Light passing through a cuvette or test tube having a blank solution therein is received by the photosensor 16 and generates a reference or blank voltage. This reference voltage will be stored in the comparing circuitry 10 in a manner to be described hereinafter. Then, a cuvette or test tube containing a liquid sample is inserted in the holder and light is passed therethrough to the photosensor 16 which generates a voltage hereinafter referred to as a test voltage. As will be described hereinafter, the photometer circuit is operable to compare the test voltage with the reference voltage and in particular to make a log comparison so that a digital output can be obtained equivalent to the log of the reference voltage over the test voltage. This number will be in units of light absorbance or in chemical concentration units. Absorbance is typically a number between 0 and 4 and is equal to the $\log_{10}$ 100 percent transmission divided by the percent transmission of light through the liquid sample over a one centimeter path length. Absorbance units are identified by the letter A and for 50 percent transmission of light through a sample the absorbance units would be 0.301 A. For ten percent transmission of light through a liquid sample the absorbance units would be 1.0 A and for $10^{-4}$ times the transmission of light through the liquid sample, the absorbance units would be 4.0 A. Accordingly, a readout of concentration units (A) are usually expressed in numbers from 0 to 4 and to three decimal places. Concentration units indicating the concentration of a chemical in a solution are arbitrarily chosen and equal to some given constant times the concentration units (A). For example, for grams of hemoglobin per hundred milliliters of blood, the concentration units will equal the absorbance units (A) times a constant equal to 36.77.

The comparing circuit 10 includes a first multi-function amplifier 18, a second multifunction amplifier 20, a voltage run-down circuit 22, first electronic switching circuitry 24 for coupling the amplifier 18 to the amplifier 20, and second electronic switching circuitry 26 for coupling the amplifier 20 to the voltage run-down circuit 22. As shown, the amplifier 18 has first and second inputs 28 and 30 and is connected to function as a comparator. The photosensor 16 is connected to the first input 28. The second amplifier 20 has a capacitor 32 connected between an input 34 thereof and an output 36 thereof. With the capacitor 32 connected between the input 34 and output 36 of the amplifier 20, the amplifier 20 functions as an integrator and together the capacitor 32 and amplifier 20 serve as a voltage storage circuit. The voltage run-down circuit 22 includes a voltage run-down capacitor 38, a voltage dropping resistor 40 and a load resistor 42. As shown, the comparing circuitry 10 also includes calibration circuitry 44 comprising two variable calibration resistors 46 and 48 and a mechanical switch 50 for connecting one or the other of the calibration resistors 46 and 48 in series circuit relationship with the capacitor 38 voltage dropping resistor 40 and load resistor 42. When the calibration resistor 46 is connected in a series circuit loop with the capacitor 38, the photometer circuit is operable to measure absorbance and the resistor 46 can be adjusted to calibrate the photometer circuit for measuring absorbance. Likewise, when the switch 50 is moved to the right to connect the calibration resistor 48 in series circuit loop with the capacitor 38, the photometer circuit is operable to measure concentration units. As shown, the position of the switch 50 will also energize one of two lamps 52 and 54 which are located on an instrument panel (not shown) and which indicate to an operator which measurements are being made by the photometer circuit. The comparing circuitry 10 also includes a feedback circuit 56 connected between the voltage run-down circuit 22 and the second input 30 of the comparator 18.

In the operation of the photometer circuit, a reference or blank voltage must first be stored in the storing capacitor 32. This is accomplished by placing a cuvette or test tube containing blank solution in the holder and passing light therethrough to the photosensor 16. The photosensor 16 then generates the reference or blank voltage which is applied to the input 28 of the comparator 18. Then, the control circuitry 12 shown in FIG. 1 is operated in a manner to be described hereinafter to close the first switching circuitry 24 and the second switching circuitry 26 for a predetermined period of time. During this predetermined period of time the reference or blank voltage applied to the input 28 of the comparator 18 is amplified in the comparator 18 and applied through the closed switching circuitry 24 to the amplifier 20 and the storage capacitor 32 which charges up to the value representative of the reference voltage. At the same time, the switching circuitry 26 is closed so that the reference voltage being stored in the capacitor 32 also appears at the output 36 of the amplifier 20 and charges the run-down capacitor 38 to the reference voltage. This reference voltage then is applied via the feedback circuit 56 to the second input 30 of the comparator 18. After a short period of time during the predetermined time period, a quiescent state is reached where the voltage on the voltage run-down capacitor 38 and applied to the second input 30 of the comparator 18 equals the reference voltage applied to the first input 28 of the comparator 18. At the same time, a reference storage voltage which, for reasons to be described hereinafter, is slightly greater than the voltage on the capacitor 38 is stored on the capacitor 32. After the predetermined time period, the switching circuitry 24, opened, switching circuitry 26 need not, but may be operated, the voltage on the capacitor 38 decays to 0 through the resistors connected in series circuit therewith and the comparing circuit 10 with a reference voltage stored on the capacitor 32 is now in condition for comparing the voltage generated from light passing through a liquid sample, i.e., a test voltage, with the reference voltage stored in the comparing circuitry 10.

The control circuitry 12 shown in FIG. 1 includes a spring biased mechanical button switch which is schematically shown in FIG. 1 and identified by the reference numeral 60, a timing circuit 62 comprising a timing capacitor 64 and electronic switching circuitry 66. The electronic switching circuitry 66 includes a field effect transistor 68 which has its gate connected to one side of the timing capacitor 64. The gate is also connected through a resistor 70 to a ground or common conductor 72. The other side of the timing capacitor 64 is connected through another resistor 74 to a positive conductor or bus 76 which is connected through a load resistor 78 and a lamp 80 to a 20-volt source. Current from the 20-volt source changes the capacitor 64 to 20 volts and the gate of the field effect transistor 68 is normally maintained at ground potential. This potential on the gate is sufficient to turn on the transistor 68. As a result, the source and drain terminals of the transistor 68 are at the same or ground potential. As shown, the drain terminal of the transistor 68 is connected to a resistor 82 connected to the base of a transistor 84 which is normally not conducting inasmuch as the base of the transistor 84 is at ground potential by reason of the conduction of the transistor 68. As shown, the drain terminal 68 is connected through a resistor 86 to a positive voltage conductor or bus 88 connected to a 5-volt source. The junction between the drain terminal of the transistor 68, the resistor 82 and the resistor 86 is identified by the reference numeral 90 and is connected to another resistor 92 which is connected to the base of a transistor 94. Since the junction 90 is normally at ground potential, the transistor 94 is normally not conducting. A resistor 96 is connected between the conductor 88 and the collector of the transistor 94 and a resistor 98 is connected between the emitter of the transistor 94 and the common conductor 72. Also, a resistor 100 is connected between the base of the transistor 94 and the common conductor 72 which in turn is connected to the base of another transistor 104. The emitter of the transistor 104 is connected to the collector of the transistor 94 which is with the transistor 94 in a nonconducting state. As a result, there is a 5-volt an emitter to base bias voltage on the transistor 104 such that it is normally in a conductive state.

As shown, the collector of the transistor 104 is connected via a conductor 106 to the switching circuitry 24 in FIG. 2. Also, the emitter of the transistor 94 is connected via a conductor 108 to the switching circuitry 26. The emitter of the transistor 94 is normally at ground potential by reason of nonconduction of the transistor 94 such that no signal is on the conductor 108 connected to the switching circuitry 26.

Referring now to the first and second electronic switching circuitries 24 and 26, the switching circuitry 24 includes a transistor 110 and a field effect transistor 112. The transistor 110 is connected between the gate terminal of the transistor 112 and a negative voltage conductor or bus 114 connected to a −24 volt source. The source terminal of the transistor 112 is connected to an output 118 of the comparator 18 and the drain terminal of the transistor 112 is connected to the input 34 of the amplifier 20 through a field effect transistor which provides isolation. As shown, the conductor 106 is connected through base biasing resistors 120 and 122 to the negative voltage bus 114. Since the transistor 104 normally conducting, there is current flow between the 5-volt bus 88 and the −24 volt bus 114 and the values of the resistors 120 and 122 are chosen so as to maintain the transistor 110 in a conducting condition. As a result, there is a negative voltage applied to the gate of the transistor 112 by reason of the circuit path from the common conductor 72 through resistors 124, 126, 128, and transistor 110 to the negative conductor or bus 114. As a result of the negative voltage applied to the gate of the transistor 112 the transistor 112 is normally in a nonconducting position and the switching circuitry 24 is in a switch-open condition.

The emitter of the transistor 94 is at ground potential and this ground potential which is connected via the conductor 108 to the emitter of a transistor 130 forming part of the second electronic switching circuitry 26. As shown, the base of the transistor 130 is connected to ground potential and the collector of the transistor 130 is connected through a resistor 132 to the base of another transistor 134 forming part of the switching circuitry 26. The emitter of the transistor 134 is coupled to the output 36 of the amplifier 20 and the collector of the transistor 134 is connected to the voltage run-down circuit 22 and the feedback circuit 56. Since the emitter and base of the transistor 130 are normally at ground potential, the transistor 130 is biased to a nonconducting state. As a result, there is no current flow through the resistor 132 to turn on the transistor 134. Accordingly, the transistor 134 is in a nonconducting state thereby placing the switching circuitry 26 in an open-circuit condition.

Referring again to FIG 1, when it is desired to operate the control circuitry 12 to place the comparing circuitry 10 in a reference voltage receiving and storing mode of operation, the switch 60 is momentarily actuated against a biasing spring 138 to connect the junction between resistor 78 and conductor 76 to ground potential. The voltage drop across resistor 78 causes the potential on the conductor 76 to go essentially to ground potential. Now the polarity of the voltage stored on the capacitor 64 effectively reverses and the voltage at the gate of the transistor 68 goes from approximately zero volts to −20 volts. This −20 volts causes the transistor 68 to stop conducting and in effect opens the connection between the junction 90 and ground potential through the transistor 68. As a result, the potential at the junction 90 goes from approximately 0 volts to some higher voltage. This higher voltage is applied to the base of the transistor 84 which then is turned on and rendered conducting and functions to connect the conductor 76 to ground potential thereby maintaining the conductor 76 at a potential close to ground potential and thereby maintaining the reversed polarity on the capacitor 64 which is now dissipating its charge through the resistors 70 and 74 As a result, the transistor 84 functions as a clamping circuit for clamping the conductor 76 to ground potential after a button switch 60 is released. The values o the resistors 70 and 74 and the capacitor 64 are choser so that approximately 4 seconds elapse while the volt age on the gate of the transistor 68 rises from −20 volt to approximately zero volts. As shown, the timing cir cuit 62 also includes a capacitor 140 which is con nected between ground potential and the junction be tween the capacitor 64 and the resistor 74. The capacitor 140 forms a transient signal by-pass circuit path around the capacitor 64.

With the voltage at the junction 90 at a higher level, the transistor 94 is turned on allowing current to flow through the resistors 96 and 98. This flow of current through the resistors 96 and 98 results in voltage drops across the resistors 96 and 98. The voltage drop across the resistor 96 results in a change in the voltage bias across the resistors 120 and 122, the junction of which is connected to the transistor 110 in the first electronic switching circuitry 24. Essentially what happens is the voltage on the base of the transistor 110 goes lower causing the transistor 110 to turn off resulting in a raising of the voltage on the gate of the transistor 112 to a point where the transistor 112 conducts placing the switching circuitry 24 in a closed circuit condition where the signal at the output of the comparator 118 is applied to the input 34 of the amplifier 20.

At the same time as a result of the voltage drop across the resistor 98, the voltage at the emitter of the transistor 94 goes from close to ground potential to some higher potential and this higher potential is transmitted via the conductor 108 to the emitter of the transistor 130. This results in emitter base voltage bias on the transistor 130 which causes the transistor 130 to conduct. A current then flows through the resistor 132 to turn on the transistor 134, thereby to couple the output 36 on the amplifier 20 to the voltage run-down circuit 22 and the feedback circuit 56. In this way the second electronic switching circuitry 26 is placed in a closed circuit condition.

The transistor 94 will remain in the conducting state so that there are voltage drops across the resistors 96 and 98 thereby to apply "switch-close signals" via the conductors 106 and 108 to the first and second electronic switching circuitries 24 and 26 for a period of approximately 4 seconds.

Since the voltage rundown capacitor 38 normally has no charge thereon, there is a rush of current through the transistor 134 to the voltage rundown circuit 22. To limit this current a resistor 144 is connected between the output 36 of the amplifier 20 and the emitter of the transistor 134. Also a transistor 146 is connected between the output 36 of the amplifier 20 and the base of the transistor 134. As shown in the transistor 146 has its base connected to the junction between the resistor 144 and the emitter of the transistor 134. The transistor 146 functions as a throttle on the current flow from the voltage storing circuit comprising the amplifier 20 and the capacitor 32. In this respect, as the current increases through the resistor 144 and transistor 134 the transistor 146 is made more conductive to reduce the base current applied through resistor 132 to the base of the transistor 134. This causes the transistor 134 to conduct less thereby reducing the current through the resistor 144 from the voltage storing circuit comprising the amplifier 20 and the capacitor 32. In this way the voltage storage circuit is not overloaded while the rundown capacitor 38 is charging to the reference voltage.

After the 4 seconds have elapsed the transistor 94 shuts off and the switching circuitries 24 and 26 are returned to the open circuit condition with a reference storage voltage stored in the capacitor 32. This voltage is slightly higher than the reference voltage by reason of the voltage drop across resistor 144.

To facilitate the calibration of the circuitry 10 of the photometer circuit two resistors, 148 and 150 of equal value are connected in series across the inputs 28 and 30 of the comparator 18. Also, a switch 152 is associated with resistors 148 and 150 and is operable to short-circuit the resistor 150, thereby reducing by one-half the load resistance on the output from the photosensor 16. The switch 152 is operated or moved downwardly to short-circuit the resistor 150 when it is desired to calibrate the photometer circuit. In this respect after a reference voltage has been stored in the capacitor 32 and the 4 second period has elapsed, the photometer is returned to a comparing and measuring mode of operation which is controlled by the readout circuitry 14 shown in FIG. 3 as will be described hereinafter. In this mode of operation the capacitor 38 is cyclically charged to the reference voltage and then allowed to decay. The cuvette containing the blank solution which was utilized to generate the reference voltage is allowed to remain in the holder, so that the photometer circuit is now testing the reference voltage. As a result, the voltage on the first input 28 is the reference voltage and the voltage of the second input 30 changes as the second electronic switching circuitry 26 is opened and closed by the readout circuitry 14 as will be described hereinafter. Initially, after the 4 second period during which the reference voltage was stored in the capacitor 32 the switching circuitry 26 is placed in an open circuit condition. Then the switching circuitry 26 is closed to permit the capacitor 38 to charge to the reference voltage, at the same time the reference voltage is being applied to the input 30. Consequently, the voltage at the two inputs to the comparator 18 are equal and there is a quisecent output signal at the output 118 of the comparator 18. Then the second switching circuitry 26 is caused to open after a predetermined time period, thereby allowing the voltage on the capacitor 38 to decay. Since the voltage on the input 28 is equal to the voltage on the input 30, as soon as the voltage starts to decay on the capacitor 38 the voltage at the input 30 goes below the voltage at the input 28 and an output signal is generated. Since the drop in the voltage on the input 30 below the voltage on the input 28 happens almost simultaneously with opening of the switching circuitry 26 the readout circuitry will generate therein a timing signal of approximately 0 duration providing a readout of approximately 0.000. Now to test the calibrate the comparing circuitry for absorbance units the switch 152 is operated or moved downwardly to short circuit the resistor 150. When this happens the voltage on the input 28 is cut essentially in half. As a result on the next closing and subsequent opening of the switching circuitry 26 a period of time will elapse while the voltage on the capacitor 38 decays to one-half its value equal to the voltage on the input 28. After this time elapses the output signal at the output 118 of the comparator changes and a timing signal is latched in the readout circuitry 14 and read out as a number equal to the absorbance unit for 50 percent transmission of light through a liquid sample. As stated previously this value is 0.301A and if the readout is not 0.301A the operator will adjust the calibration resistor 46 until the readout is 0.301. Now when measuring concentration units the calibration resistor 48 will be adjusted until the appropriate readout in concentration units corresponding to the liquid sample is obtained.

As shown the feedback circuit 56 includes a resistance capacitor circuit 156 which increases the band width for high frequency response. Also, it will be apparent that the dropping resistor 40 provides an initial voltage drop when the switching circuitry 26 is opened and the voltage on the capacitor 38 is allowed to decay. This voltage drop across the resistor 40 serves to compensate for the inadequate high frequency response of the amplifier-comparator 18. This phenomenon of inadequate high frequency response or slewing and the manner in which resistor 40 compensates for this inadequate high frequency response is more fully described in copending application Ser. No. 351,794 filed on Ap. 16, 1973 and entitled, "VOLTAGE RUN-DOWN CIRCUIT issued as U.S. Pat. No. 3,863,066 on Jan 28, 1975."

Referring now to FIG. 3, the control, measurement and read-out circuitry 14 includes first control circuitry 160, second control circuitry 162, timing circuitry 164, and read-out devices 166. The first control circuitry 160 is a set reset bi-stable multivibrator having a set input 168, a reset input 170 and a $\overline{Q}$ output 172. The $\overline{Q}$ output 172 is connected via a conductor 174 to the emitter of the transistor 130 of the second electronic switching circuitry 26. The $\overline{Q}$ output is also connected via a conductor 176 to the second control circuitry 162. The set input 168 is connected via a conductor 178 to an output of the timing circuitry 164 as will be more fully discussed hereafter.

Referring to FIGS. 2 and 3, the output 118 of the comparator 18 is connected through an RC circuit 180 to a conductor 182 connected to an input of the second control circuit 162. The R.C. circuit 180 serves as a current limiting and high frequency speed-up response circuit. The second control circuit 162 is formed from a conventional integrated circuit referred to as a hex inverter. This circuit has an inverted output 184 which will be referred to as the strobe output and is connected to the timing circuitry 164 for latching a timing signal generated in the timing circuitry 164. The control circuitry 162 also has another output terminal 186 which will be referred to as the reset output and which is also connected to the timing circuitry 164 for transmitting a reset signal to the timing circuitry 164 for clearing the timing signal stared therein and for starting a new timing signal.

The timing circuitry includes an oscillator 188 a divider 190 and first, second and third decoder/driver, latch/ counter circuits 191, 192, and 193 also referred to as counter/latch/decoder/driver circuits and hereinafter referred to simply as counter circuits. Each of the counter circuits 191–193 has a strobe input 191S, 192S, 193S connected to a conductor 194 connected to the strobe output 184 of the second control circuitry 162. Also, each of the counter circuits 191–193 has a reset input 191R–193R respectively connected to the reset output terminal 186 of the second control circuitry 162. Also, each of the counter circuits 191–193 has 10 outputs corresponding to the numbers 0–9. The oscillator 188 is connected to the divider 190 which in turn is connected to an input 201 of the first counter circuit 191, the output of which is connected to the input 202 of the second counter circuit 192, the output of which is in turn, connected to the input 203 of the third counter circuit 193. The output 204 of the third counter circuit 193 is connected to the conductor 178 and through a capacitor 206 to the set input 168 of the first control circuitry 160.

The oscillator 188 is a 100 kilohertz oscillator and the divider 190 divides out 10 kilohertz. The 10 kilohertz signal is applied to the input 201 of the first counter circuit 191 which will produce a signal at one of the 0–9 outputs as it receives and counts pulse signals from the divider 190 until it reaches a count of 10 at which time it will apply a pulse to the input 202 of the second counter circuit 192. Obviously, the signals to the input 202 will be at a frequency of 1 kilohertz. Likewise, the signals to the input 203 of the counter circuit 193 will be at a frequency of 100 hertz and the frequency of the output signal at the output 204 of the counter circuit 193 will be at a frequency of 10 hertz.

The readout device 164 includes three lamps, such as Nixie tubes, 211, 212, and 213 each of which has 0–9 cathodes for lighting up the numbers 0–9 when energized and the 0–9 cathodes are connected respectively to the 0–9 outputs of the respective counter circuits 191, 192, and 193. The Nixie tubes 211, 212, and 213 are arranged side by side and a small lamp (shown next to tube 211) provides a decimal point such that the Nixie tube 211 will provide thousandth numbers 0.001–0.009, the Nixie tube 212 will provide hundredths numbers between 0.010–0.090, and the Nixie tube 213 will provide tenths between 0.100 and 0.900.

It will be apparent for the foregoing that the timing circuitry 164 will operate to generate a timing signal which is essentially a count or a count signal.

The counter circuit 193 operates in such a manner that the output signal at the output 204 goes from a high to a low after 800 pulses or oscillations have been applied to the input 201 of the counter circuit 191 and then goes from a low to a high after 1000 pulses or oscillations have been applied to the input 201 of the counter circuit 191. This is shown graphically in FIG. 3. This characteristic of the counter circuit 193 to be high for 80 milliseconds and low for 20 milliseconds is utilized by the control circuitry 160. In this respect, while the output signal at the output 204 is high, no operative signal is applied to the set input 168 of the bi-stable multivibrator 169 which does not respond to D.C. or leading edge signals. As a result, the signal at the $\overline{Q}$ output 172 is at a high value and this high value is applied via the conductor 174 to the emitter of the transistor 130 to turn on the transistor 130 and the transistor 134 thereby placing the second electronic switching circuitry 26 in a close circuit condition. During this 80 milliseconds while the electronic circuitry 26 is closed, the run-down capacitor 38 charges to the reference voltage. Then the signal at the output 204 goes from high to low and a pulse is generated in the capacitor 206 which is applied to the set input 168 to change the signal at the $\overline{Q}$ output 172 from a high to a low. This causes the opening of the electronic switching circuitry 26 to start a decay or rundown of the voltage on the capacitor 38. At the same time, this signal or change from a high to a low is applied via the conductor 176 through a capacitor 220 to create a pulse signal which is applied to the second control circuitry 162 which sends a positive reset signal via a conductor 222 to the divider circuit 190 and a reset signal via the output 186 to the reset inputs 191R–193R of the counter circuits 191–193. This immediately clears the counter circuits 191–193 of any count being counted therein and causes the divider circuit 190 to initiate the application of a new series of pulses or oscillations, i.e. a new count or a new signal to the first counter circuit 191. The counter circuits 191, 192, and 193 now begin to count. This count has been referred to previouosly a the generation of a timing signal and can be referred to as a timing signal or a count or count signal. In th meantime, the signal from the output 118 is at a low value by reason of the voltage on the input 30, the decaying reference voltage, being greater than the input voltage 28 from the photosensor 16 which, for a test or comparison, is now receiving light through a liquid sample and generating a voltage which is less than the reference voltage. Now, when the decaying reference voltage equals and goes below the test voltage, the signal at the output 118 of the comparator 18 goes from low to high and is inverted in the second control circuitry 162 such that a strobe signal from high to low appears at the strobe output 184 and is applied to the strobe inputs 191S–193S of the counter circuits 193. This causes the counter circuits 191–193 to immediately latch the count therein and simultaneously transfer the count or count signal to the 0–9 output terminals which are connected to the 0–9 cathodes of the Nixie tubes 211–213 and a number is immediately presented by the Nixie tubes arranged side by side. At the same time, the strobe signal on the conductor 184 is applied via a conductor 224 to the reset input 170 of the bi-stable multivibrator 160. This results in a change of the signal at the $\bar{Q}$ output 172 from low to high to close the second electronic switching circuitry 162. This immediately raises the voltage at the input 30 to the reference voltage and above the test voltage on the input 28 of the comparator 18. As a result the signal at the output 118 of comparator 18 goes from high to low and correspondingly the strobe signal at the output 184 of the control circuitry 162 goes from low to high. This change in the strobe signal also is utilized within the control circuitry 162 to generate a reset signal at the output 186 which is applied to the reset inputs 191R–193R of the counter circuits 191–193 to allow them to start another count while the previously latched count or timing signal is applied to the Nixie tubes 211–213. As a result, the signal at the output 204 of the counter circuit 193 will be high and will stay high for another count of 800 or a time period of 80 milliseconds at which time another signal will be transmitted via the conductor 178 to the set input 168 to cause opening of the switching circuitry 26 to start another voltage rundown or decay of the voltage on the capacitor 38. The above described operations will be cyclically repeated and the photometer circuit will repeatedly and cyclically compare the reference voltage with the test voltage. More specifically, the photometer circuit will measure the time it takes for the reference voltage to decay to the test voltage and this time is related to the log of the reference voltage over the test voltage and is equated to the log of the reference voltage over the test voltage so that the readout device 166 provides a readout of absorbance units or concentration units as previously described.

The readout device 166 also includes a neon lamp 250 which is elongate and arranged to simulate the number 1 when placed on the other side of the decimal point adjacent the Nixie tube 213. In this respect it will be appreciated that the neon lamp 250 and the Nixie tubes 211–213 will be arranged in reversed order side by side from that shown in FIG. 3 so as to present a readable number to an operator of the photometer including the photometer circuit described herein. The timing circuitry 164 includes control circuitry 252 for controlling the energization of the neon lamp 250 so that when the count signal or timing signal exceeds 1000, the neon lamp 250 is energized to light up and show a 1 on the readout device 166 and to cause the neon lamp 250 to blink when the count signal or timing signal is or exceeds 2000.

As shown, the control circuitry 252 includes a fourth decoder/driver, latch/counter circuit 254 which has an input 256 connected to the output 204 of the third counter circuit 193. The counter circuit 254 also has an output 258 which is connected to ground potential when a count of 1,000 is received therein and an output terminal 260 which is connected to ground potential when a count signal of 2,000 is received therein. Also, as shown, the counter circuit 254 has a strobe input 254S and a reset input 254R.

As shown, the neon lamp 250 is connected in series with a transistor 264 which has its base connected to a 5-voltage source and its emitter connected through a diode to the terminal 258. It will be apparent that when the counter circuit 254 receives a count of 1,000 and the terminal 258 is connected to ground potential, a closed circuit path from a voltage source of 250 volts through the neon lamp 250 and the transistor 264 is completed to ground potential on the terminal 258 to cause the neon lamp 250 to light up.

Now, when the count or timing signal is or exceeds 2,000, the connection of the terminal 258 to ground potential is open-circuited and the transistor 264 becomes nonconductive and the neon lamp 250 goes off. However, as shown, the emitter of the transistor 264 is also connected to the collector of another transistor 266 which has its emitter connected to the output terminal 260 which is now connected to ground potential by reason of the count signal being or exceeding 2,000. Also, it will be apparent that the 5-volt bias voltage is applied through two resistors to the base of the transistor 266 to turn on the transistor 266 so that a closed series circuit path is established from the 250-volt source through the neon lamp 250, the transistor 264, the transistor 266 to the ground potential on the terminal 260. However, as shown, a junction 270 between the two resistors connected to the base of the transistor 266 is connected to the collector of another transistor 272. The emitter of the transistor 272 is connected to ground potential and the base of the transistor 272 is connected through a resistor to the output 204 of the counter circuit 193. It will be recalled that the signal at the output 204 goes from high to low between every count of 800 to 1,000 in the counting circuits 191–193. As a result, after a timing signal or count signal is latched and is for a count above 2,000, the signal at the output 204 will go high causing the transistor 272 to turn on and thereby ground the junction 270 which in turn grounds the base of transistor 266 turning transistor 266 off thereby also turning off transistor 264. As a result, the series circuit path for energizing the neon lamp 250 is open-circuited causing the neon lamp to go off. Then, when a count of 800 is reached, the signal at the output 204 goes from high to low shutting off transistor 272 and turning on transistor 266 so that the neon lamp will be energized while the signal at the output 204 is low. This will occur for a period of 20 milliseconds and then the lamp will be off for 80 milliseconds. Since the counter circuits 191–193 are continually counting so long as a signal at or above a count of 2,000 is latched, the lamp 250 will blink on for 20 milliseconds every 80 milliseconds. This blinking of the lamp 250 will indicate to the operator that a count signal of or over 2,000 is being represented on the readout device 166.

An output of the fourth counter circuit 254 is connected via a conductor 280 to a clock input of the bistable multivibrator 160. When no comparison has been made by the photometer circuit, an output signal will appear after a count of 10,000 on the conductor 280 to reset the bi-stable multivibrator 160 to cause the same to cause the electronic switching circuit 26 to close again to recharge the capacitor 38.

From the foregoing description it will be apparent that the comparing circuitry 10, the control circuitry 12 and the readout circuitry 14 as well as the various subcircuits comprising the same provide an improved photometer circuit which has a simple means for placing the photometer circuit in a reference voltage receiving and storing mode for a predetermined period of time and for automatically returning the photometer circuit to a testing, comparing and measuring mode of operation which cyclically and repeatedly makes comparisons between a stored reference voltage and a test voltage to provide a digital readout in absorbance units or concentration units related to the light transmitted through a liquid sample. Also, the timing circuitry 164 and the readout circuitry 166 provide a simple means for indicating to the operator namely by a blinking neon lamp when the digital readout of absorbancy in its concentration units is a number between 2.000 and 3.000; also, the photometer circuit of the present invention has a number of advantages some of which have been described above and others of which are inherent in the invention. Accordingly, the scope of the invention is only to be limited as necessitated by the accompanying claims.

What it is desired to secure by Letters Patent of the United States:

1. In a photometer circuit operable to compare a reference signal with a test signal, the improvement comprising control circuit means operable to place said photometer circuit in a receiving and storing mode of operation for a predetermined period of time, during which time a reference signal is received and stored in said photometer circuit, and grounding means connected to said control circuit means comprising a switch connected to ground, a series circuit of a transistor and a line connectable to ground, said series circuit shunting said switch, and means for placing said transistor into conduction for a predetermined period of time when said switch is closed, wherein at the instant the switch contacts touch, the transistor provides a path to ground and is held clamped until the end of a timing interval, thereby rendering the control circuit means independent of manners of switch operations.

2. The photometer circuit according to claim 1 wherein said control circuit means include electronic switching circuitry, a timing circuit coupled to said electronic switching circuitry said switch being connected to said timing circuit, switching means within said photometer circuit to which output signals from said electronic switching circuitry established by operation of said control circuit means are applied for placing said photometer circuit in a signal receiving and storing mode of operation for said predetermined time.

3. The photometer circuit according to claim 2 including signal receiving and storage circuitry and wherein said electronic switching circuitry is connected to two electronic switching circuits in said signal receiving and storage circuitry.

4. The photometer circuit according to claim 2 wherein said timing circuit includes a timing capacitor and wherein said electronic switching circuitry includes said transistor the emitter thereof being connected to said line connectable to ground, a field effect transistor, one side of said timing capacitor being connected to the gate of said field effect transistor, and the other side being coupled to a conductor which is connectable to a voltage source, said switch being a mechanical switch, said conductor also being connected to said mechanical switch such that upon actuation of said mechanical switch the potential on said conductor is reduced essentially to ground potential causing a reversal of polarity of the voltage on the capacitor which causes operation of said field effect transistor, the time of discharge of said timing capacitor determining the time said field effect transistor is operated.

5. The photometer circuit according to claim 4 wherein said switch is a button switch spring biased to an open circuit position and said control circuit means include said clamping circuit for clamping said conductor to ground after said button switch is released.

6. In a photometer circuit operable to compare a reference signal with a test signal, the improvement comprising control circuit means operable to place said photometer circuit in a receiving and storing mode of operation for a predetermined period of time, during which time a reference signal is received and stored in said photometer circuit, said photometer circuit including first and second multifunction amplifiers, a first electronic switch means for coupling the output of said first amplifier to an input of said second amplifier, a reference voltage storage circuit coupled to said second amplifier, a voltage storage circuit coupled to said second amplifier, a voltage run-down circuit, a second electronic switch means for coupling the output of said second amplifier with said voltage run-down circuit, and a feedback circuit coupled between said voltage run-down circuit and an input to said first amplifier, said control circuit means being coupled to said first and second electronic switch means for controlling operation of same when it is desired to store a reference voltage in said reference voltage storage circuit.

7. The photometer circuit according to claim 6 including a photoresponsive device connected to one of two inputs of said first multifunction amplifier, the second input being connected to said feedback circuit, first and second series connected resistors connected across said inputs of said first multifunction amplifier, and mechanical switch means for short-circuiting one of said resistors so that the input signal from said photoresponsive device can be essentially cut in half to produce an output signal from said photometer circuit which should be one-half of the output signal before said resistor is short-circuited whereby a test can be made on the accuracy of said photometer circuit to facilitate adjustments to said photometer circuit to render same more accurate.

8. The photometer circuit according to claim 6 wherein said voltage run-down circuit includes a capacitor connected between said second electronic switch means and ground potential and a voltage dropping resistor connected in series with said capacitor.

9. The photometer circuit according to claim 8 including a load resistor in parallel coupled relationship with said capacitor so as to form at least part of a series circuit loop with said voltage dropping resistor and said capacitance for discharging said capacitor when said second electronic switch means is opened.

10. The photometer circuit according to claim 9 including at least two variable calibration resistors and switching means for connecting one or the other of said variable calibration resistors in series with said load resistor.

11. The photometer circuit according to claim 6 wherein said control circuit means include electronic switching circuitry, a timing circuit coupled to said electronic switching circuitry and a mechanical switch connected to said timing circuit, said electronic switching circuitry being coupled to said first and second electronic switch means within said photometer circuit for placing each of said switch means in a closed-circuit condition for placing said photometer circuit in a signal receiving and storing mode of operation for said predetermined period of time.

12. The photometer circuit according to claim 11 wherein said timing circuit includes a timing capacitor and wherein said electronic switching circuitry includes a field effect transistor, one side of said timing capacitor being connected to the gate of said field effect transistor and the other side being coupled to a conductor which is connectable to a voltage source, said conductor also being connected to said mechanical switch such that upon actuation of said mechanical switch the potential on said conductor is reduced essentially to ground potential causing a reversal of polarity of the voltage on the capacitor which causes operation of said field effect transistor, the time of discharge of said timing capacitor determining the time said field effect transistor is operated.

13. The photometer circuit according to claim 12 wherein said mechanical switch is a button switch spring biased to an open circuit position and said control circuit means include a clamping circuit for clamping said conductor to ground after said button switch is released.

14. The photometer circuit according to claim 6 comprising a photoresponsive device connected to one of two inputs of said first multifunction amplifier which is a comparator, the other input being connected to said feedback circuit, said comparator being operative to compare a test voltage generated in said photoresponsive device with a voltage decay of a reference voltage temporarily stored in said voltage run-down circuit, and said photometer circuit further comprising readout means including timing means, a readout device coupled to said timing means, first control means and second control means, said first control means being coupled to said timing means, to said second control means and to said second electronic switch means and said second control means being coupled to said output of said comparator, to said timing means and to said first control means, said timing means being operative to generate a timed duration signal which is applied to said first control means to cause said first control means to transmit a switch-close signal to said second electronic switch means to close the same for a predetermined duration during which said voltage run-down circuit is charged to the reference voltage stored in said storage circuit, the output signal from said comparator being at a quiescent value by reason of the fact that the reference voltage which is being applied via said feedback circuit to one input of said comparator is greater than the voltage applied to the other input from said photoresponsive device which is receiving the light passing through a liquid sample, and being operative after said timed duration to cause said first control means to transmit a switch-open signal to said second electronic switch means to open the same to start a voltage decay of the reference voltage stored in said voltage run-down circuit and now being applied via said feedback circuit to said one input of said comparator and at the same time to transmit a signal to said second control means to cause said second control means to send a reset signal to said timing means for starting the generation of a timing signal equivalent to the time which elapses from the start of the voltage decay until the voltage decays to the value of the test voltage at which time the output from said comparator changes generating a control signal which causes said second control means to send a latch signal to said timing means which latches a timing signal at a desired point in time and transmits said timing signal to said readout device which presents a readout equivalent to the log of the reference voltage over the test voltage, said latch signal also being applied to said first control means to reset the same, and causes said second control means to send a reset signal to said timing means for generating another timed duration signal to repeat the operations.

15. The photometer circuit according to claim 14 wherein said first control means comprise a set reset bistable multivibrator having a set input connected via a conductor to an output of said timing means, a reset input connected via a conductor to said second control means and an output connected via a conductor to said second control means and via another conductor to said second electronic switch means.

16. The photometer circuit according to claim 14 wherein said second control means has an input connected via conductor to the output from said comparator, a strobe output connected via a conductor to said timing means and to a reset input of said first control means and a second output connected via conductor to a reset input of said timing means.

17. The photometer circuit according to claim 14 wherein said timing means comprise an oscillator circuit and first, second, and third decoder/driver,latch/counter circuits, the output from said oscillator being coupled to said first counter circuit which in turn is connected to the input of said second counter circuit which in turn is connected to the input of said third counter circuit, each of said counter circuits having a strobe input connected to one output of said second control means, a reset input connected to another output of said second control means, and said third counter circuit having its output connected to a set input of said first control means.

18. The photometer circuit according to claim 17 wherein said readout device includes three Nixie tubes each of which has ten terminals corresponding to the numbers 0–0, each input terminal being connected to a corresponding output terminal from one of said first, second, and third counter circuits.

19. The photometer circuit according to claim 18 wherein said readout device further comprises a neon lamp positioned in said readout device to form the number one and said timing means also include control circuitry for said neon lamp, said control circuitry being coupled to the output from said third counter circuit and to said neon lamp and being operative to energize said neon lamp upon receiving a signal indicating a count of at least 1,000 from said third counter circuit, to energize said neon lamp intermittently upon receiving a signal indicating a count of at least 2,000 from said third counter circuit and to de-energize said lamp for a count at or above 3,000.

20. The photometer circuit according to claim 19 wherein said control circuitry includes a fourth decoder/ driver,latch/counter circuit, electronic switch means connected in series with said neon lamp and one terminal of said fourth counter circuit, which terminal is connected to common or ground potential when said fourth counter circuit receives a signal indicating a count of 1,000 from said third counter circuit thereby to establish a closed-series-circuit between a source of positive potential and ground potential through said neon lamp and said electronic switch means.

21. The photometer circuit according to claim 20 wherein said control circuitry includes a second electronic switch connected in series with said neon lamp and connected to a second output terminal of said fourth counter circuit which second output is connected to ground or common potential when a signal indicating a count of 2,000 is received by said fourth counter circuit from said third counter circuit thereby to complete a closed circuit path from the source of positive potential through said neon lamp and said second electronic switch to ground potential, and a normally closed third electronic switch connected between the base of said second electronic switch and ground potential thereby to place said second electronic switch in an open circuit condition so that the neon lamp is not energized, and the base of the third electronic switch being connected to the output of said third counter circuit which output goes from one signal level to another signal level between counts of 800 and 1,000 in said third counter circuit, said change in signal level being applied to said base of said third electronic switch to open said third electronic switch thereby allowing said second electronic switch to close causing energization of said neon lamp for each count of 800 to 1,000 whereby said readout device presents a blinking light to indicate a latched timing signal related to a number count between 2,000 and 3,000.

22. A photometer circuit including a comparator having first and second inputs, a reference voltage storage circuit, a voltage run-down circuit, electronic switch means for coupling the output of said storage circuit to said voltage run-down circuit, a photoresponsive device connected to said first input, a feedback circuit coupled between said voltage run-down circuit and said second input, said comparator being operative to compare a test voltage generated in said photoresponsive device with a voltage decay of a reference voltage temporarily stored in said voltage run-down circuit, timing means, a readout device coupled to said timing means, first control means and second control means, said first control means being coupled to said timing means, to said second control means and to said electronic switch means and said second control means being coupled to said output of said comparator, to said timing means and to said first control means, said timing means being operative to generate a timed duration signal which is applied to said fist control means to cause said first control means to transmit a switch-close signal to said electronic switch means to close the same for a predetermined duration during which said voltage run-down circuit is charged to a reference voltage stored in said storage circuit, the output signal from said comparator being at a quiescent value by reason of the fact that eh reference the which is being applied via said feedback circuit to said second input is greater than the voltage applied to said first input from said photoresponsive device which is receiving the light passing through a liquid sample, and being operative after said timed duration to cause said first control means to transmit a switch-open signal to said electronic switch means to open the same to start a voltage decay of the reference voltage stored in said voltage run-down circuit and now being applied via said feedback circuit to said second input and at the same time to transmit a signal to said second control means to cause said second control means to send a reset signal to said timing means for starting the generation of a timing signal equivalent to the time which lapses from the start of the voltage decay until the voltage decays to the value of the test voltage, at which time the output from said comparator changes generating a control signal which causes said second control means to send a latch signal to said timing means which latches the timing signal at a desired point in time and transmits said latched timing signal to said readout device which presents a readout equivalent to the log of the reference voltage over the test voltage, said latch signal also being applied to said first control means to reset the same, and causes said second control means to send a reset signal to said timing means for generating another timed duration signal to repeat the operations.

* * * * *

UNITED STATES PATENT OFFICE
CERTIFICATE OF CORRECTION

Patent No. 3,952,206   Dated   April 20, 1976

Inventor(s)   Gerhard A. Liedholz        Page 1 of 3

It is certified that error appears in the above-identified patent and that said Letters Patent are hereby corrected as shown below:

Column 2, line 25, "curcuit" should read -- circuit --.

Column 3, line 47, put quotes around the letter "A".

Column 5, line 21, "changes" should read -- charges --.

Column 8, line 32, "quisecent" should read -- quiescent --.

Column 8, line 46, "the", first occurrence, should read -- and --

Column 9, line 41, "stared" should read -- stored --.

Column 10, line 22, "for" should read -- from --.

Column 10, line 37, "169" should read -- 160 --.

Column 16, line 55, "0-0" should read -- 0-9 --.

Column 17, line 1, before "and" insert a comma.

Column 17, line 18, after "output" insert -- terminal --.

Column 18, line 12, "fist" should read -- first --.

Column 18, line 19, "eh" should read -- the --.

Column 18, line 19, "the" should read -- voltage --.

Column 5, 6,9 and 10, should appear as shown on the attached sheets.

Signed and Sealed this

Twenty-fifth Day of January 1977

[SEAL]

Attest:

RUTH C. MASON
Attesting Officer

C. MARSHALL DANN
Commissioner of Patents and Trademarks decays to 0 through the resistors connected in series circuit therewith and the comparing circuit 10 with a reference voltage stored on the capacitor 32 is now in condition for comparing the voltage generated from light passing through a liquid sample, i.e., a test voltage, with the reference voltage stored in the comparing circuitry 10.

The control circuitry 12 shown in FIG. 1 includes a spring biased mechanical button switch which is schematically shown in FIG. 1 and identified by the reference numeral 60, a timing circuit 62 comprising a timing capacitor 64 and electronic switching circuitry 66. The electronic switching circuitry 66 includes a field effect transistor 68 which has its gate connected to one side of the timing capacitor 64. The gate is also connected through a resistor 70 to a ground or common conductor 72. The other side of the timing capacitor 64 is connected through another resistor 74 to a positive conductor or bus 76 which is connected through a load resistor 78 and a lamp 80 to a 20-volt source. Current from the 20-volt source changes the capacitor 64 to 20 volts and the gate of the field effect transistor 68 is normally maintained at ground potential. This potential on the gate is sufficient to turn on the transistor 68. As a result, the source and drain terminals of the transistor 68 are at the same or ground potential. As shown, the drain terminal of the transistor 68 is connected to a resistor 82 connected to the base of a transistor 84 which is normally not conducting inasmuch as the base of the transistor 84 is at ground potential by reason of the conduction of the transistor 68. As shown, the drain terminal 68 is connected through a resistor 86 to a positive voltage conductor or bus 88 connected to a 5-volt source. The junction between the drain terminal of the transistor 68, the resistor 82 and the resistor 86 is identified by the reference numeral 90 and is connected to another resistor 92 which is connected to the base of a transistor 94. Since the junction 90 is normally at ground potential, the transistor 94 is normally not conducting. A resistor 96 is connected between the conductor 88 and the collector of the transistor 94 and a resistor 98 is connected between the emitter of the transistor 94 and the common conductor 72. Also, a resistor 100 is connected between the base of the transistor 94 and the common conductor 72 which in turn is connected to the base of another transistor 104. The emitter of the transistor 104 is connected to the collector of the transistor 94 which is with the transistor 94 in a nonconducting state. As a result, there is a 5-volt an emitter to base bias voltage on the transistor 104 such that it is normally in a conductive state.

As shown, the collector of the transistor 104 is connected via a conductor 106 to the switching circuitry 24 in FIG. 2. Also, the emitter of the transistor 94 is connected via a conductor 108 to the switching circuitry 26. The emitter of the transistor 94 is normally at ground potential by reason of nonconduction of the transistor 94 such that no signal is on the conductor 108 connected to the switching circuitry 26.

Referring now to the first and second electronic switching circuitries 24 and 26, the switching circuitry 24 includes a transistor 110 and a field effect transistor 112. The transistor 110 is connected between the gate terminal of the transistor 112 and a negative voltage conductor or bus 114 connected to a −24 volt source. The source terminal of the transistor 112 is connected to an output 118 of the comparator 18 and the drain terminal of the transistor 112 is connected to the input 34 of the amplifier 20 through a field effect transistor which provides isolation. As shown, the conductor 106 is connected through base biasing resistors 120 and 122 to the negative voltage bus 114. Since the transistor 104 normally conducting, there is current flow between the 5-volt bus 88 and the −24 volt bus 114 and the values of the resistors 120 and 122 are chosen so as to maintain the transistor 110 in a conducting condition. As a result, there is a negative voltage applied to the gate of the transistor 112 by reason of the circuit path from the common conductor 72 through resistors 124, 126, 128, and transistor 110 to the negative conductor or bus 114. As a result of the negative voltage applied to the gate of the transistor 112 the transistor 112 is normally in a nonconducting position and the switching circuitry 24 is in a switch-open condition.

The emitter of the transistor 94 is at ground potential and this ground potential which is connected via the conductor 108 to the emitter of a transistor 130 forming part of the second electronic switching circuitry 26. As shown, the base of the transistor 130 is connected to ground potential and the collector of the transistor 130 is connected through a resistor 132 to the base of another transistor 134 forming part of the switching circuitry 26. The emitter of the transistor 134 is coupled to the output 36 of the amplifier 20 and the collector of the transistor 134 is connected to the voltage run-down circuit 22 and the feedback circuit 56. Since the emitter and base of the transistor 130 are normally at ground potential, the transistor 130 is biased to a nonconducting state. As a result, there is no current flow through the resistor 132 to turn on the transistor 134. Accordingly, the transistor 134 is in a nonconducting state thereby placing the switching circuitry 26 in an open-circuit condition.

Referring again to FIG 1, when it is desired to operate the control circuitry 12 to place the comparing circuitry 10 in a reference voltage receiving and storing mode of operation, the switch 60 is momentarily actuated against a biasing spring 138 to connect the junction between resistor 78 and conductor 76 to ground potential. The voltage drop across resistor 78 causes the potential on the conductor 76 to go essentially to ground potential. Now the polarity of the voltage stored on the capacitor 64 effectively reverses and the voltage at the gate of the transistor 68 goes from approximately zero volts to −20 volts. This −20 volts causes the transistor 68 to stop conducting and in effect opens the connection between the junction 90 and ground potential through the transistor 68. As a result, the potential at the junction 90 goes from approximately 0 volts to some higher voltage. This higher voltage is applied to the base of the transistor 84 which then is turned on and rendered conducting and functions to connect the conductor 76 to ground potential thereby maintaining the conductor 76 at a potential close to ground potential and thereby maintaining the reversed polarity on the capacitor 64 which is now dissipating its charge through the resistors 70 and 74. As a result, the transistor 84 functions as a clamping circuit for clamping the conductor 76 to ground potential after a button switch 60 is released. The values of the resistors 70 and 74 and the capacitor 64 are chosen so that approximately 4 seconds elapse while the voltage on the gate of the transistor 68 rises from −20 volts to approximately zero volts. As shown, the timing circuit 62 also includes a capacitor 140 which is connected between ground potential and the junction bevoltage drop when the switching circuitry 26 is opened and the voltage on the capacitor 38 is allowed to decay. This voltage drop across the resistor 40 serves to compensate for the inadequate high frequency response of the amplifier-comparator 18. This phenomenon of inadequate high frequency response or slewing and the manner in which resistor 40 compensates for this inadequate high frequency response is more fully described in copending application Ser. No. 351,794 filed on Ap. 16, 1973 and entitled, "VOLTAGE RUN-DOWN CIRCUIT issued as U.S. Pat. No. 3,863,066 on Jan 28, 1975."

Referring now to FIG. 3, the control, measurement and read-out circuitry 14 includes first control circuitry 160, second control circuitry 162, timing circuitry 164, and read-out devices 166. The first control circuitry 160 is a set reset bi-stable multivibrator having a set input 168, a reset input 170 and a $\overline{Q}$ output 172. The $\overline{Q}$ output 172 is connected via a conductor 174 to the emitter of the transistor 130 of the second electronic switching circuitry 26. The $\overline{Q}$ output is also connected via a conductor 176 to the second control circuitry 162. The set input 168 is connected via a conductor 178 to an output of the timing circuitry 164 as will be more fully discussed hereafter.

Referring to FIGS. 2 and 3, the output 118 of the comparator 18 is connected through an RC circuit 180 to a conductor 182 connected to an input of the second control circuit 162. The R.C. circuit 180 serves as a current limiting and high frequency speed-up response circuit. The second control circuit 162 is formed from a conventional integrated circuit referred to as a hex inverter. This circuit has an inverted output 184 which will be referred to as the strobe output and is connected to the timing circuitry 164 for latching a timing signal generated in the timing circuitry 164. The control circuitry 162 also has another output terminal 186 which will be referred to as the reset output and which is also connected to the timing circuitry 164 for transmitting a reset signal to the timing circuitry 164 for clearing the timing signal stared therein and for starting a new timing signal.

The timing circuitry includes an oscillator 188 a divider 190 and first, second and third decoder/driver, latch/ counter circuits 191, 192, and 193 also referred to as counter/latch/decoder/driver circuits and hereinafter referred to simply as counter circuits. Each of the counter circuits 191-193 has a strobe input 191S, 192S, 193S connected to a conductor 194 connected to the strobe output 184 of the second control circuitry 162. Also, each of the counter circuits 191-193 has a reset input 191R-193R respectively connected to the reset output terminal 186 of the second control circuitry 162. Also, each of the counter circuits 191-193 has 10 outputs corresponding to the numbers 0-9. The oscillator 188 is connected to the divider 190 which in turn is connected to an input 201 of the first counter circuit 191, the output of which is connected to the input 202 of the second counter circuit 192, the output of which is in turn, connected to the input 203 of the third counter circuit 193. The output 204 of the third counter circuit 193 is connected to the conductor 178 and through a capacitor 206 to the set input 168 of the first control circuitry 160.

The oscillator 188 is a 100 kilohertz oscillator and the divider 190 divides out 10 kilohertz. The 10 kilohertz signal is applied to the input 201 of the first counter circuit 191 which will produce a signal at one of the 0-9 outputs as it receives and counts pulse signals from the divider 190 until it reaches a count of 10 at which time it will apply a pulse to the input 202 of the second counter circuit 192. Obviously, the signals to the input 202 will be at a frequency of 1 kilohertz. Likewise, the signals to the input 203 of the counter circuit 193 will be at a frequency of 100 hertz and the frequency of the output signal at the output 204 of the counter circuit 193 will be at a frequency of 10 hertz.

The readout device 164 includes three lamps, such as Nixie tubes, 211, 212, and 213 each of which has 0-9 cathodes for lighting up the numbers 0-9 when energized and the 0-9 cathodes are connected respectively to the 0-9 outputs of the respective counter circuits 191, 192, and 193. The Nixie tubes 211, 212, and 213 are arranged side by side and a small lamp (shown next to tube 211) provides a decimal point such that the Nixie tube 211 will provide thousandth numbers 0.001-0.009, the Nixie tube 212 will provide hundredths numbers between 0.010-0.090, and the Nixie tube 213 will provide tenths between 0.100 and 0.900.

It will be apparent for the foregoing that the timing circuitry 164 will operate to generate a timing signal which is essentially a count or a count signal.

The counter circuit 193 operates in such a manner that the output signal at the output 204 goes from a high to a low after 800 pulses or oscillations have been applied to the input 201 of the counter circuit 191 and then goes from a low to a high after 1000 pulses or oscillations have been applied to the input 201 of the counter circuit 191. This is shown graphically in FIG. 3. This characteristic of the counter circuit 193 to be high for 80 milliseconds and low for 20 milliseconds is utilized by the control circuitry 160. In this respect, while the output signal at the output 204 is high, no operative signal is applied to the set input 168 of the bi-stable multivibrator 169 which does not respond to D.C. or leading edge signals. As a result, the signal at the $\overline{Q}$ output 172 is at a high value and this high value is applied via the conductor 174 to the emitter of the transistor 130 to turn on the transistor 130 and the transistor 134 thereby placing the second electronic switching circuitry 26 in a close circuit condition. During this 80 milliseconds while the electronic circuitry 26 is closed, the run-down capacitor 38 charges to the reference voltage. Then the signal at the output 204 goes from high to low and a pulse is generated in the capacitor 206 which is applied to the set input 168 to change the signal at the $\overline{Q}$ output 172 from a high to a low. This causes the opening of the electronic switching circuitry 26 to start a decay or rundown of the voltage on the capacitor 38. At the same time, this signal or change from a high to a low is applied via the conductor 176 through a capacitor 220 to create a pulse signal which is applied to the second control circuitry 162 which sends a positive reset signal via a conductor 222 to the divider circuit 190 and a reset signal via the output 186 to the reset inputs 191R-193R of the counter circuits 191-193. This immediately clears the counter circuits 191-193 of any count being counted therein and causes the divider circuit 190 to initiate the application of a new series of pulses or oscillations, i.e., a new count or a new signal to the first counter circuit 191. The counter circuits 191, 192, and 193 now begin to count. This count has been referred to previouosly as the generation of a timing signal and can be referred to as a timing signal or a count or count signal. In the meantime, the signal from the output 118 is at a low